United States Patent

Morimoto et al.

[11] 4,021,006
[45] May 3, 1977

[54] CONTAINER FOR MAGNETIC TAPE

[75] Inventors: Toshio Morimoto; Takehisa Takamiya, both of Hirakata, Japan

[73] Assignee: Matsushita Electric Industrial Co., Ltd., Osaka, Japan

[22] Filed: Nov. 14, 1975

[21] Appl. No.: 632,162

[30] Foreign Application Priority Data

| Nov. 20, 1974 | Japan | 49-134105 |
| Nov. 20, 1974 | Japan | 49-134106 |
| Nov. 21, 1974 | Japan | 49-142174[U] |
| Nov. 21, 1974 | Japan | 49-142175[U] |
| Nov. 21, 1974 | Japan | 49-142176[U] |
| Dec. 9, 1974 | Japan | 49-149401[U] |
| Dec. 9, 1974 | Japan | 49-149402[U] |
| Dec. 10, 1974 | Japan | 49-149930[U] |

[52] U.S. Cl. .................. 242/199; 352/72; 360/96
[51] Int. Cl.² .......... G03B 1/04; G11B 15/32; G11B 23/04
[58] Field of Search ............ 242/197–200, 242/55.19 A; 360/92, 96, 60; 352/72, 78 R, 78 A

[56] References Cited

UNITED STATES PATENTS

| 3,766,327 | 10/1973 | Johnson et al. | 360/96 |
| 3,828,363 | 8/1974 | Somers | 360/60 |
| 3,882,542 | 5/1975 | Nakamichi | 360/96 |
| 3,900,172 | 8/1975 | Kamaya | 242/198 |
| 3,934,270 | 1/1976 | Iwata | 360/96 |

Primary Examiner—Leonard D. Christian
Attorney, Agent, or Firm—Wenderoth, Lind & Ponack

[57] ABSTRACT

A cassette for accommodating a magnetic tape designed for use in a magnetic recording and/or reproducing apparatus includes a protective covering provided at an access opening of the cassette into which access opening a transducer head is adapted to project to contact a portion of the magnetic tape. The protective covering is movable between opened and closed positions and is normally biased to the closed position to shield such portion of the magnetic tape from the outside. When the protective covering is moved to the opened position, such portion of the magnetic tape is exposed to the exterior of the cassette for permitting the transducer head to contact such portion of the magnetic tape. The cassette is further provided with a braking lever which applies a braking force to both of the reels to prevent the magnetic tape from being loosened.

8 Claims, 21 Drawing Figures

CONTAINER FOR MAGNETIC TAPE

BACKGROUND OF THE INVENTION

The present invention relates to a container for magnetic tape designed for use in a magnetic recording and/or reproducing apparatus.

It is well known that, depending upon the type of magnetic recording and/or reproducing apparatus, which is hereinafter referred to as a magnetic tape player, a container in which magnetic tape is housed is generally referred to as either a "cartridge" or a "cassette". The magnetic tape stored in the cartridge is a substantially endless loop while that in the cassette is unlooped and has both ends secured to respective reels. A recent development is a miniature container or 'micro-cassette' which is similar in structure to, but smaller in size than, the cassette and which is used in a magnetic tape player specifically designed for use with such miniature container.

In any event, the conventional container for magnetic tape is formed at the front thereof with at least two access openings; one for a magnetic recording and/or reproducing transducer assembly to project thereinto for sliding engagement with the magnetic tape, and the other for either of a capstan and a pinch roller to project thereinto for driving the magnetic tape in cooperation with the other of a capstan and a pinch roller with the magnetic tape sandwiched therebetween.

In the conventional tape container of the type referred to above, consecutive portions of the magnetic tape housed therein are bared to the outside through the access openings so that the magnetic tape tends to be broken, or otherwise deteriorated. For example, when the magnetic tape within the container is slackened, a portion of the magnetic tape tends to be loosened out of the container particularly through the access opening for the transducer assembly and would result in formation of one or more traces of breakage and/or bend. This has been often experienced because of the fact that a portion of the magnetic tape located within the access opening for the transducer assembly is outwardly biased by an elastic back-up element which is necessitated to facilitate a tight sliding contact between the transducer assembly and the magnetic tape during recording or reproduction of audio information on the magnetic tape.

Moreover, those portions of the magnetic tape located within the access openings tend to be easily touched by the finger of, for example, an operator of a magnetic tape player in an attempt to load the tape container in the magnetic tape player.

Once the magnetic tape is impaired in any of these ways, the performance characteristics of the magnetic tape tend to be adversely affected as is well understood by those skilled in the art.

On the other hand, slackening of the magnetic tape within the container obviously results from the fact that reels to which the respective ends of the magnetic tape are secured and which are housed within the tape container are allowed to rotate freely. In order to avoid this, there is known a tape container wherein frictional shoes each supported on a leaf spring or like elastic member are constantly engaged to the respective reels to impart a frictional force to these reels.

Since the frictional shoes are constantly engaged to the respective reels within the tape container even during the use in a magnetic tape player, there is a possibility that rotation of one of the reels which is coupled to a motor-driven shaft in the magnetic tape player to wind the magnetic tape from the other of the reels onto such one of the reels will be hampered to an extent that fluctuation may occur in the speed of transference of the magnetic tape. Moreover, a consecutive portion of the magnetic tape running from one reel to the other reel is so constantly held under tension that the magnetic tape tends to be easily physically fatigued.

It is also well known that there are various types of magnetic tape now commercially available. For example, a magnetic tape or chromium-coated magnetic tape wherein finely divided particles of chromium oxide are deposited on a plastic tape, a magnetic tape or ordinary magnetic tape wherein finely divided particles of iron oxide are deposited on a plastic tape, a magnetic tape generally referred to as a super low noise tape, and others are now commercially available. These types of magnetic tape have their own performance characteristics quite different from each other.

In order that the magnetic tapes of different type can exhibit their own optimum performance characteristics when used in a particular magnetic tape player, it is also well known that one or both of the peak value of bias current to be applied from a bias oscillator to a transducer assembly and the level of output from an equalizer circuitry are to be varied to meet the specifications of the one particular type of magnetic tape being used. Heretofore, the necessary adjustment is carried out by manipulating switches which are respectively inserted in the bias current generating circuit and equalizer circuit and which are arranged on a control panel in the magnetic tape player.

However, it has often been observed that an operator of the magnetic tape player fails to manipulate one or both of these switches without recognizing the particular type of magnetic tape being loaded in the magnetic tape player. This is because loading the magnetic tape and, therefore, a tape container, in the magnetic tape player and manipulating one or both of these switches are separate and independent procedures and are not associated with each other. Moreover, even if the operator of the magnetic tape player has correctly and promptly manipulated one or both of the switches according to the specification or type of magnetic tape being loaded in the magnetic tape player, there will be a possibility that one or both of the switch may be moved to a wrong position or positions during performance of the magnetic tape player.

SUMMARY OF THE INVENTION

Accordingly, an essential object of the present invention is to provide an improved container for magnetic tape designed for use in a magnetic tape player, wherein a protective covering is provided at the access opening for the transducer assembly for substantially avoiding any possibility of the magnetic tape being touched by hand and/or contaminated by dusts floating in the air, with substantial elimination of the disadvantages and inconveniences inherent in the conventional tape container.

Another important object of the present invention is to provide an improved tape container of the type referred to above, wherein means is formed for automatically changing the peak value of bias current to be applied to the transducer head and/or the level of output from the equalizer in response to placement of the tape container within a tape container receiving chamber of the magnetic tape player.

A further object of the present invention is to provide an improved tape container of the type referred to above, wherein there is further provided braking means for applying a braking force to both of the reels within the tape container so long as the tape container is not loaded in the tape container receiving chamber of the magnetic tape player, thereby avoiding the possibility of slackening or loosening of the magnetic tape contained in the tape container.

A still further object of the present invention is to provide an improved tape container of the type referred to above, which can readily be assembled and ensures a high performance of the magnetic tape player because of facilitation of the use of a high performance transducer assembly.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Before the description of the present invention proceeds, it is to be noted that like parts are designated by like reference numerals througout the accompanying drawings. It is further to be noted that, for the sake of description of the present invention, the tape container to which the present invention is directed will be described by way of a cassette having a pair of spaced reels to which respective ends of a magnetic tape are secured, it being understood that the concept of the present invention can equally be applicable not only to the cassette, but also to the micro-cassette and the cartridge.

Referring first to FIGS. 1 to 6, the tape container is shown in the form of a cassette, generally indicated by 10, of commercially standardized size. The cassette 10 accommodates therein a pair of spaced reels 11 and 12 to which respective ends of a magnetic tape T are secured in any known manner.

Figure 4:
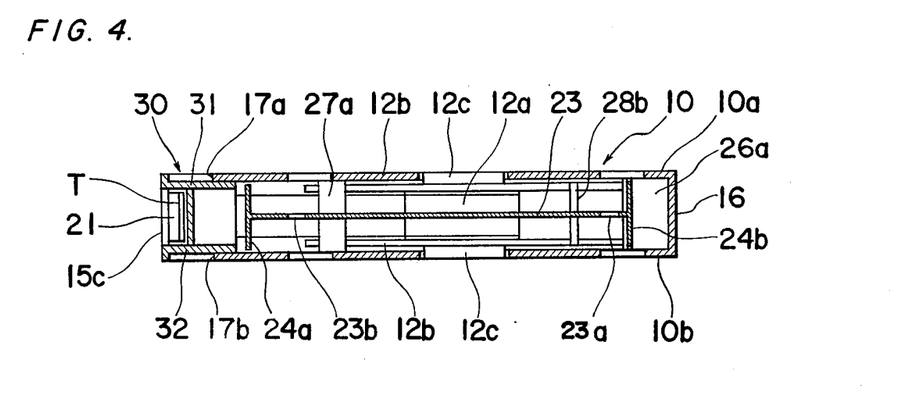
FIG. 4 is a side sectional view of the tape container of FIG. 1, shown in relation to a magnetic transducer assembly.

Each of the reels 11 and 12 is of double flanged configuration and comprises a cylindrical body 11a or 12a having both ends formed with radially outwardly extending flanges 11b or 12b, and a hub 11c or 12c formed on and outwardly projecting from each end of the cylindrical body 11a or 12a. These reels 11 and 12 are accommodated within the cassette 10 with the hubs 11c or 12c of each of reels 11 or 12 journalled, respectively, to bearing openings formed in top and bottom plate members 10a and 10b of the cassette 10, as best shown in FIG. 4.

The top and bottom plate members 10a and 10b are connected to each other in any known manner by means of a pair of opposed side walls 13 and 14 and a pair of opposed front and rear walls, the rear wall being indicated by 16 while the front wall is to be understood as composed of separate wall portions 15a, 15b, 15c and 15d. A portion of the front edge of each of the plate members 10a and 10b is, as indicated by 17a or 17b, inwardly recessed to provide an access opening into which a transducer head assembly can be penetrated as will be described later.

Access openings 18a and 18b adapted to receive capstans 19a and 19b extending therethrough when the tape container 10 is loaded in the magnetic tape player (not shown), that is, placed within a cassette receiving chamber of the magnetic tape player, are formed on the front edges of the top and bottom plate members 10a and 10b on respective sides of and adjacent to the access opening defined by the inward recesses 17a and 17b in the plate members 10a and 10b. It is to be noted that each of the access openings 18a and 18b may be in the form of a hole or in the form of a recess such as shown.

In the construction so far described, the magnetic tape T extends from one reel 12 to the other reel 11 first deflected by a roll element 19 and then deflected by another roll element 20, a portion of magnetic tape T between roll elements 19 and 20 extending through the access opening for the transducer head assembly by way of slits 21 and 22 which are respectively formed in the wall portions 15c and 15b.

Slidably extending within the cassette 10 and between the reels 11 and 12 is a braking lever 23, the plane of which lever 23 lies intermediately between the flanges 11b or 12b of each of the reels 11 and 12 as best shown in FIG. 4.

As best shown in FIG. 4, the braking lever 23 has both ends rigidly secured to, or otherwise integrally formed with, respective upright supports 24a and 24b each extending between the top and bottom plate members 10a and 10b so that the braking lever 23 is supported in position with its plane lying substantially intermediately of the height of each of the reels 11 and 12. This braking lever 23 is movable between operative and inoperative positions and is normally biased by a wire spring 25 to the operative position.

For avoiding a displaced movement of the braking lever 23 between the operative and inoperative positions, two sets of pairs of guides 26a, 26b and 27a and 27b are utilized, which guides of each pair are located on lateral sides of the braking lever 23 and concurrently serve as spacers between the top and bottom plate members 10a and 10b.

Figure 1:
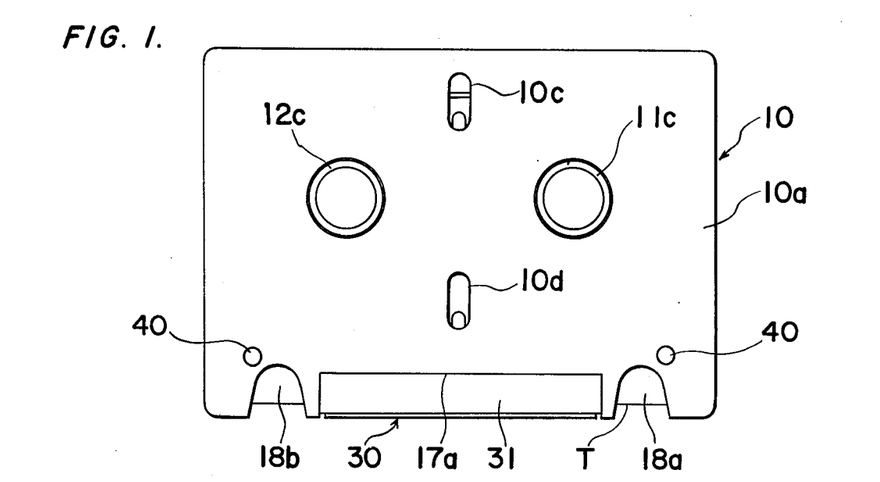
FIG. 1 is a top plan view of a tape container according to the present invention.
Figure 2:
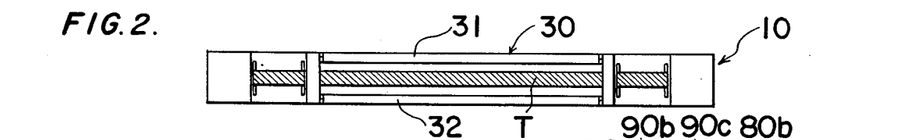
FIG. 2 is a front elevational view of the tape container of FIG. 1.
Figure 3:
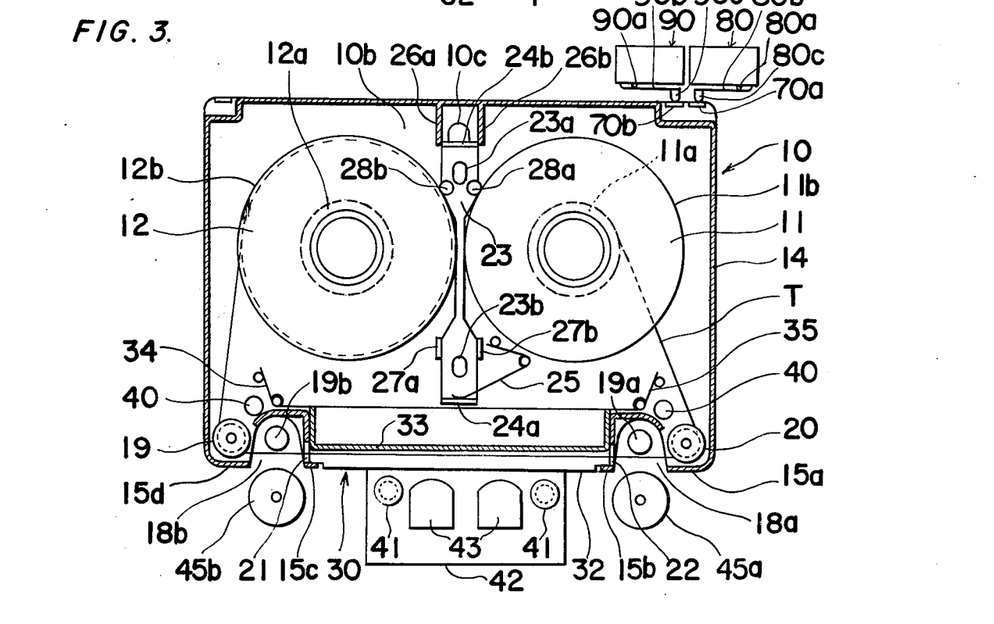
FIG. 3 is a top plan view of the tape container of FIG. 1, with the top casing removed.

The braking lever 23 carries thereon a pair of spaced braking pins 28a and 28b each having both ends terminating adjacent the outer peripheries of the respective flanges of a corresponding one of the reels 11 and 12. More specifically, so long as the braking lever 23 is held in the operative position, the opposite ends of the pin 28a are engaged to the respective flanges 11b of the reel 11, and the opposite ends of the pin 28b are engaged to the respective flanges 12b of the reel 12 as shown in FIG. 3, thereby applying respective braking forces to the reels 11 and 12. However, when the braking lever 23 is moved from the operative position towards the inoperative position against the wire spring 25 in a manner as will be described later, the pins 28a and 28b separate from the flanges 11b and 12b of the respective reels 11 and 12, thereby allowing the reels 11 and 12 to rotate freely.

It is to be noted that, instead of the wire spring 25, any spring element, for example, a compression or tension spring or a leaf spring, may be employed for the same purpose as achieved by the wire spring 25.

The braking lever 23 is formed therein with a pair of spaced slots 23a and 23b which are, when the braking lever 23 is held in the inoperative position, aligned with respective slots 10c and 10d formed on each of the top and bottom plate members 10a and 10b, the function of slots 23a and 23b in cooperation with slots 10c and 10d being described later. However, it is to be noted that, when the braking lever 23 is held in the operative position as shown in FIGS. 1 to 4, one end of each of the slots 23a and 23b, which is situated on the leading side with respect to the direction of movement of the braking lever 23 from the operative position towards the inoperative position is partially overlapped by one end of the corresponding slot 10c or 10d which is situated on the trailing side with respect to the direction of movement of the braking lever 23 from the operative position towards the inoperative position.

Within the access opening for the transducer head assembly which is defined by the inward recesses 17a and 17b, a protective covering generally indicated by 30 is retractably supported in position by the cassette 10. More specifically, the protective covering 30 comprises a pair of spaced, substantially rectangular plate members 31 and 32 connected with each other by means of a wall member 33 which extends in parallel relation to and rearwardly of that portion of the magnetic tape T between the roll elements 19 and 20. The height of the wall member 33 is so selected that the plate members 31 and 32 can be substantially telescopically retractable into the interior of the cassette 10 in a manner as will be described later in connection with the operation of the cassette according to the present invention.

The protective covering 30 of the construction as hereinbefore described is supported in position for movement between projected and retracted positions and is normally biased to the projected position by a pair of spaced wire springs 34 and 35. It is to be noted that the spacing between respective ends of the front wall portions 15b and 15c adjacent the slits 22 and 21 is selected to be so smaller than the width of any of the plate members 31 and 32 that the projected position of the protective covering 30 can be defined by such ends of front wall portions 15b and 15c to which front edges of plate members 31 and 32 respectively abut.

The protective covering 30 may be of one-piece construction.

In the foregoing embodiment, the braking lever 23 and the protective covering 30 have been described as formed separately. However, the braking lever and the protective covering may be connected to, or otherwise integrally formed with, each other. Specifically, this can be attained, for example, by connecting the upright support 24a to the rear edges of the plate members 31 and 32. In this case, such elements as the guides 27a and 27b, the slots 23b and 10b and either of the wire spring 25 and the wire springs 34 and 35, which have been described as employed in the embodiment of FIGS. 1 to 6, may be omitted. (Even in the embodiment of FIGS. 1 to 6, either of the slots 23a and 23b may not always be necessary.)

Reference numeral 40 employed throughout the accompanying drawings represents a pair of holes formed in the cassette 10 which are adapted to receive corresponding positioning pins (not shown) provided in the cassette receiving chamber of the magnetic tape player for holding the cassette in position within the cassette receiving chamber with the tape T exactly aligned with the transducer head assembly as is well known to those skilled in the art.

So far as the embodiment of FIGS. 1 to 6 is concerned, for moving the braking lever 23 from the operative position towards the inoperative position, at least one actuating pin member is necessary. Although this actuating pin member is not shown in the accompanying drawing, it is to be understood that the actuating pin member has one end situated within the cassette receiving chamber of the magnetic tape player and the other end operatively coupled to a manipulating mechanism accessible to the operator of the magnetic tape player.

With the above in mind, when the cassette 10 of the construction according to the present invention is placed into the cassette receiving chamber of the magnetic tape player, the actuating pin member is inserted through one of the slots 10c and 10d in the cassette 10 and then through the corresponding one of the slots 23a and 23b which is aligned with such one of the slots 10c and 10d. At this time, the positioning pins are also received in the holes 40 for exactly positioning the cassette within the cassette receiving chamber of the magnetic tape player.

Figure 6:
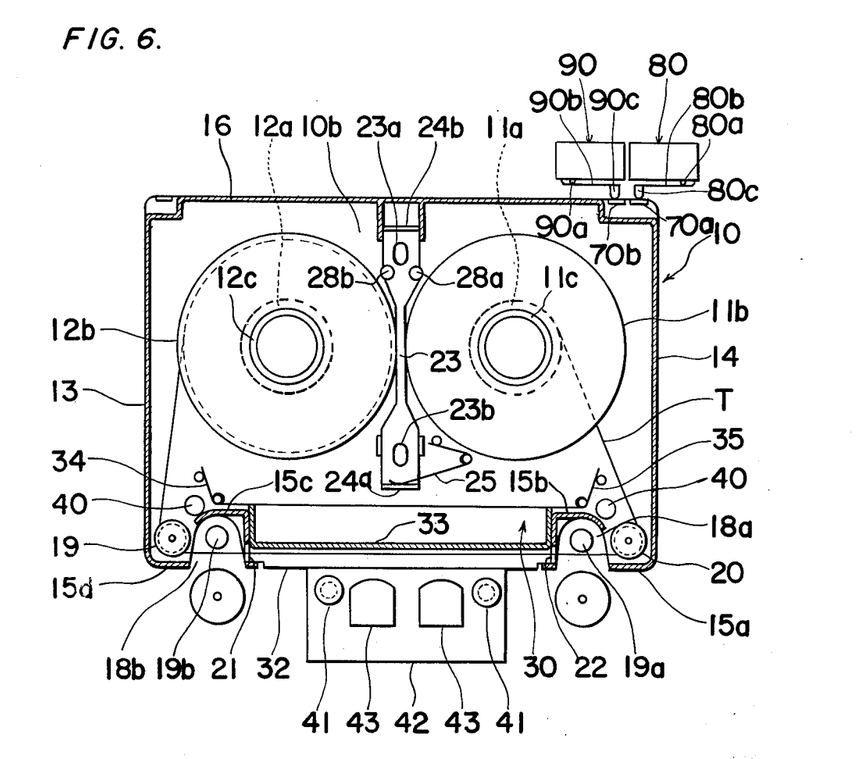
FIG. 6 is a view similar to FIG. 3, showing the braking lever in the inoperative position while the protective covering is held in the closed position.

When the manipulating mechanism is subsequently operated in readiness for performance of the magnetic tape player, the actuating pin member is moved along the slot 10c or 10d accompanying a corresponding movement of the braking lever 23 whereby the latter can be moved from the operative position, as shown in FIGS. 3 and 4, to the inoperative position as shown in FIG. 6 with the braking pins 28a and 28b on the braking lever 23 separated from the flanges of the reels 11 and 12. The condition of the braking lever 23 as shown in FIG. 6 is maintained so long as the cassette 10 is accommodated within the cassette receiving chamber of the magnetic tape player.

The actuating pin member, which has been moved to move the braking lever 23 from the operative position to the inoperative position may be designed so as to return to the original position in response to either removal of the cassette 10 out of the cassette receiving chamber of the magnetic tape player or return of the manipulating mechanism.

Alternatively, instead of the use of the manipulating mechanism including the above described actuating pin member, at least one stationary pin may be employed, in which case the stationary pin must project from the bottom of the cassette receiving chamber of the magnetic tape player within the cassette receiving chamber. Specifically, the stationary pin is designed to have one end rigidly secured to the bottom of the cassette receiving chamber of the magnetic tape player and the other end substantially outwardly tapered so that, when the cassette 10 is placed within the cassette receiving chamber, the braking lever 23 can be moved from the operative position towards the inoperative position as the tapered end of the stationary pin penetrating through the slot 10c or 10d of the cassette 10 is inserted through the slot 23a or 23b on the brakinglever 23.

Figure 5:
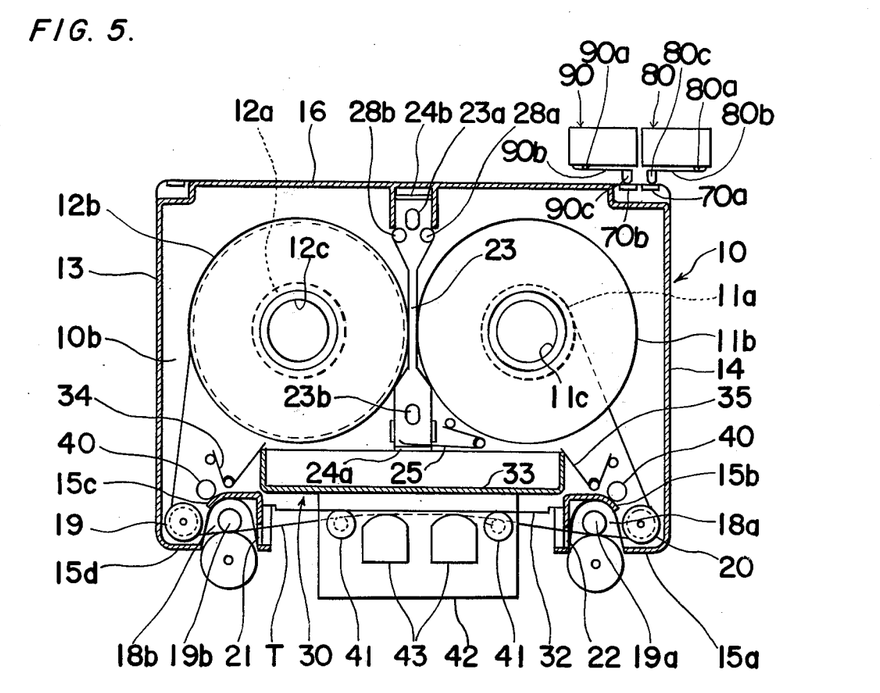
FIG. 5 is a view similar to FIG. 3, showing a braking lever and a protective covering respectively held in an inoperative position and an opened position.

With respect to the movement of the protective covering 30 between the projected position and the retracted position, it can be effected in many methods. One of these methods as illustrated in FIGS. 3 to 6 is the use of a pair of pushers generally indicated by 41 and carried by a movable carrier plate 42. The movable carrier plate 42 is a support for the transducer assembly, which in the instance as shown in composed of a pair of transducer heads 43 rigidly mounted thereon in side-by-side relation to each other. The movable carrier plate 42 is movable between inoperative and operative positions in any known manner. By way of example, when a known "PLAY" button is depressed to bring the magnetic tape player in position to reproduce the information which has been recorded on the magnetic tape or when a known "RECORD" button is depressed together with the "PLAY" button to bring the magnetic tape player in position to record information on the magnetic tape, the movable carrier plate 42 is moved from the inoperative position, as shown in FIGS. 3 and 6, to the operative position as shown in FIG. 5.

The pushers 41 are rigidly mounted on the movable carrier plate 42 at respective sides of the transducer assembly and are of the same construction as will subsequently be described with particular reference to FIG. 7.

Figure 7:
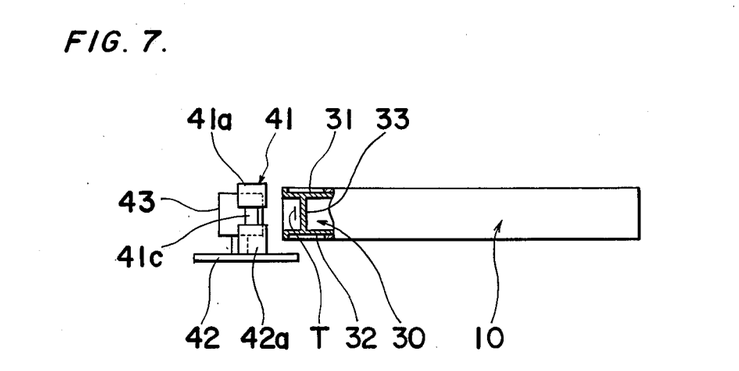
FIG. 7 is a partially sectional side view of the tape container shown in relation to the transducer assembly.
Figure 8:
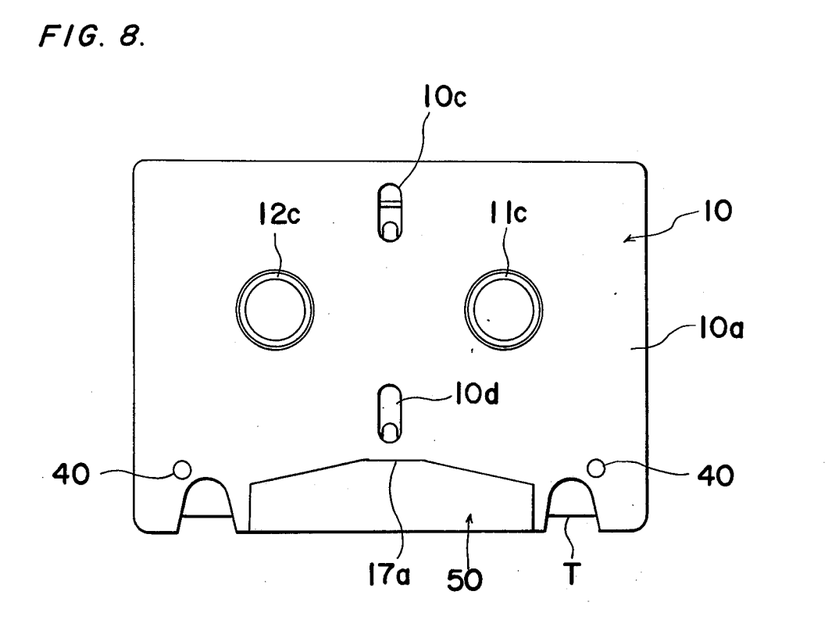
FIG. 8 is a view similar to FIG. 1, showing the tape container according to another embodiment of the present invention.

As best shown in FIG. 7, each of the pushers 41 comprises a substantially cylindrical pin having both ends enlarged in diameter to provide an abutment 41a and 41b, a substantially intermediate portion 41c having a length slightly greater than the width of the magnetic tape T.

With the above in mind, when the carrier plate 42 is moved from the inoperative position towards the operative position, the abutments 41a and 41b of the pushers 41 engage the respective front edges of the plate member 31 and 32 forming the protective covering 30, thereby pushing the protective covering 30 from the projected position towards the retracted position against the wire springs 34 and 35. Therefore, it is clear that, when the protective covering 30 is moved to the retracted position as shown in FIG. 5, that portion of the magnetic tape T which has been protected by the protective covering 30 in the manner as shown in FIGS. 3, 4 and 6, is then in a position out of the protective covering 30 and held in contact with the transducer heads 43 in readiness for recording or reproduction of information on the magnetic tape T.

In FIG. 5, the braking lever 23 is depicted as moved further beyond the inoperative position in the direction opposite to the operative position. This is because when the protective covering 30 is moved to the retracted position, the rear edges of the plate members 31 and 32 forming protective covering 30 engage the upright support 24a, thereby pushing the braking lever 23 beyond the inoperative position. However, if the length of the braking lever 23 is sufficiently smaller, no contact between the protective covering 30 and the braking lever 23, as described above, will occur as the protective covering 30 is moved towards the retracted position and, therefore, there will be no possibility that the braking lever 23 is moved further beyond the inoperative position. In such case, the slots 23a and 23b may be replaced by circular openings.

It is to be noted that, when the carrier plate 42 is returned from the operative position towards the inoperative position, the protective covering 30 can return to the original position by the biasing force of wire springs 34 and 35. It is also be be noted that, pinch rollers 45a and 45b respectively cooperative with the capstans 19a and 19b are also moved towards the associated capstans 19a and 19b to drive the tape T when the carrier plate 42 is moved from the inoperative position towards the operative position as is well known to those skilled in the art.

Instead of using the pushers 41, the heads 43 may be made to engage the front edges of the plate members 31 and 32 to push the protective covering from the projected position towards the retracted position as the carrier plate 42 is moved from the inoperative position towards the operative position against the wire springs 34 and 35.

In the foregoing embodiment shown in FIGS. 1 to 7, even if the protective covering 30 is utilized according to the teachings of the present invention, that portion of the magnetic tape T which is located within the access opening for the transducer assembly is not substantially completely enclosed. However, in the following embodiments which will subsequently be described with reference to FIGS. 8 to 12 and FIGS. 13 to 15, respectively, the protective covering is designed such as to substantially completely enclose that portion of the magnetic tape T in the tape cassette 10. It is, however, to be noted that the braking lever 23 having the upright supports 24a and 24b secured to the opposed ends of the braking lever 23 is, in the respective instances as shown in FIGS. 8 to 12 and FIGS. 13 to 15, designed so as to have the upright support 24a accommodated within a space defined between the guides 27a and 27b while the slot 23b is omitted.

Figure 9:
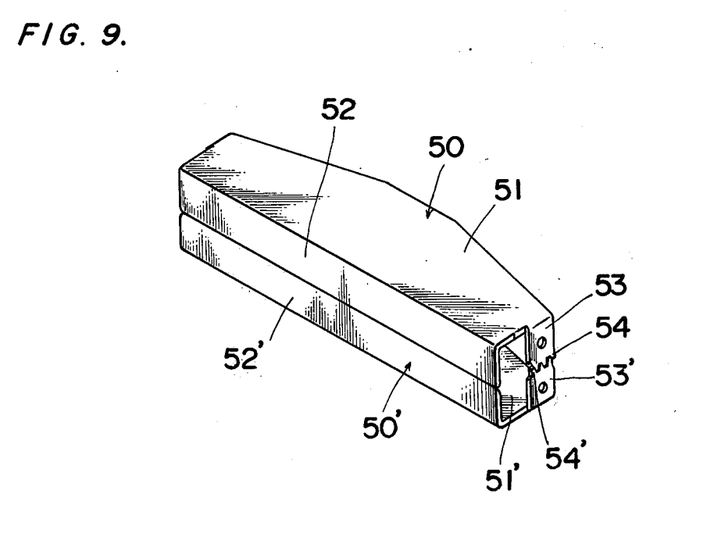
FIG. 9 is a perspective view of a protective covering employed in the tape container of FIG. 8.

Referring now to FIGS. 8 to 12, and particularly with reference to FIG. 9, the protective covering comprises first and second lids 50 and 50' of the same construction. Since the first and second lids 50 and 50' are of the same construction, the structural details will now be described in connection with one of the first and second lids, that is, the first lid 50. However, it is to be understood that elements of the second lid 50' which correspond in function and structure to that of the first lid 50 are designated by like reference numerals each having a prime.

The first lid 50 comprises a substantially elongated plate member 51 having one side edge integrally formed with a lip 52, the plane of lip 52 lying substantially perpendicular to the plane of plate member 51. The elongated plate member 51 has both ends integrally formed with a lug 53. The lug 53 has one end contiguous from the plate member 51 and the other end rounded and toothed to provide a segmental gear 54. The lug 53 extends in the same direction as the lip 52 from the plate member 51 and, therefore, has a plane perpendicular to the plane of the plate member 51 and also to the plane of the lip 52.

Figure 10:
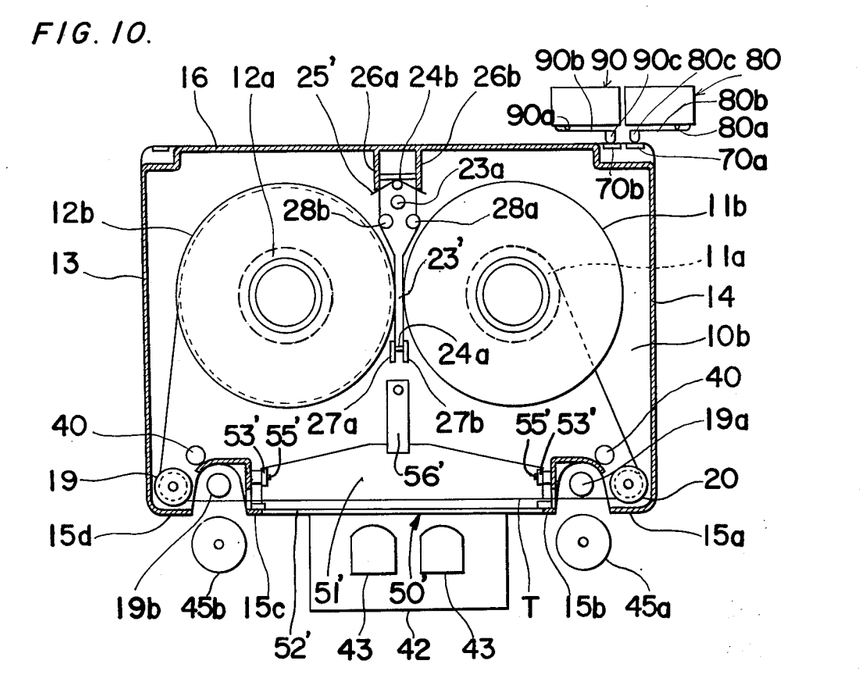
FIG. 10 is a top plan view of the tape container of FIG. 8, with the top casing removed.
Figure 11:
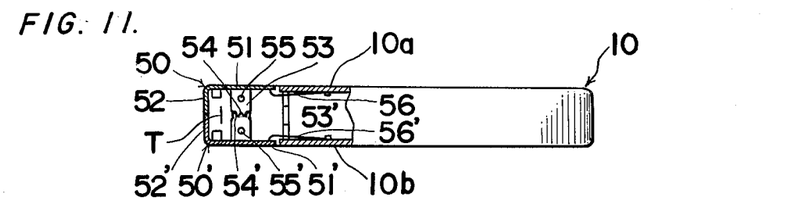
FIG. 11 is a partially sectional side view of the tape container of FIG. 8 with the protective covering in the closed position.

While each of the first and second lids 50 and 50' is constructed in the manner as hereinbefore described, the first and second lids 50 and 50' are pivotally mounted on the tape cassette 10, at the access opening for the transducer assembly, one above the other with the segmental gears 54 in either one of the first and second lids meshed with the segmental gear of the other of the first and second lids. More specifically, as can be seen from FIGS. 8 and 10 to 12, the first lid 50 is supported in position with the lugs 53 pivotally connected to the front wall portions 15b and 5c by means of suitable connecting elements 55, such as screws or headed pin members, it being understood that the connecting elements 55 associated with the first lid 50 are not illustrated, but similar connecting elements associated with the second lid 50' are illustrated in FIG. 10 and designated by 55'. In this condition, the plane of the lip 52 of the first lid 50 lies on the same plane as any of the front wall portions 15a and 15b.

Similarly, the second lid 50' is supported in position with the lugs 53' pivotally connected to the front wall portions 15b and 15c by means of the connecting elements 55' with the plane of the lip 52' lying on the same plane as any of the front wall portions 15a and 15b and lip 52 of the first lid 50.

These first and second lids 50 and 50' are biased about the connecting elements 55 and 55' by respective leaf springs 56 and 56', each having one end connected to the plate member 10a or 10b and the other end engaged to the other side portion of the plate member 51 or 51', respectively, so that the lips 52 and 52' of the respective lids 50 and 50' are engaged to each other to enclose that portion of the magnetic tape T behind the lips and inside the plate members 51 and 51'. At this time, a passage for the magnetic tape T is defined between the ends of the lips 52 and 52' and the adjacent side edges of the lugs 53 and 53'.

Figure 12:
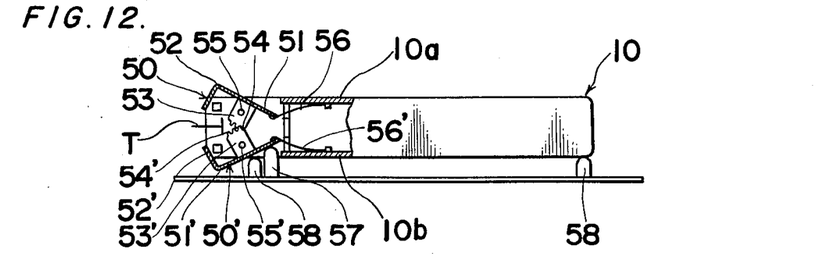
FIG. 12 is a view similar to FIG. 11, showing the protective covering in the opened position.

The closed lips 52 and 52' of the protective covering according to the embodiment of FIGS. 8 to 12 can be separated from each other to permit that portion of the magnetic tape T to be accessible to the transducer assembly and, particularly, the heads 43, when the tape cassette 10 is placed within the cassette receiving chamber. To this end, as best shown in FIG. 12, at least one actuating pin 57, higher than any of a plurality of mounting pins 58 projecting from the bottom of the cassette receiving chamber for the support of the cassette 10 thereon, is secured to the bottom of the cassette receiving chamber of the magnetic tape player. This actuating pin 57 is arranged such that, when the cassette 10 is placed within the cassette receiving chamber of the magnetic tape player, the tip of actuating pin 57 pushes the side portion of the plate member 51' remote from the lip 52' thereby causing the second lid 50' to pivot about the connecting elements 55' against the leaf spring 56'. In practice, the pivotal movement of the second lid 50' which occurs in the manner as hereinbefore described is transmitted to the first lid 50 by means of the constant engagement between the segmental gear 54' in the second lid 50' and the segmental gear 54 in the first lid 50. Therefore, it is clear that both of the lids 50 and 50' can be pivoted in the opposite directions against the respective leaf springs 56 and 56' in response to placement of the tape cassette within the cassette receiving chamber of the magnetic tape player so that the lips 52 and 52' are separated from each other.

Figure 13:
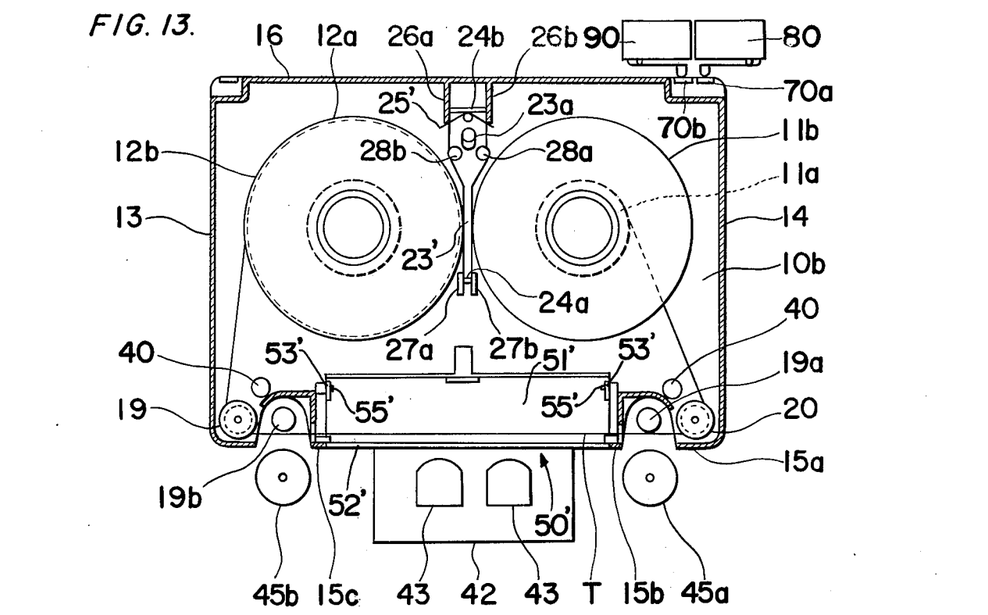
FIG. 13 is a view similar to FIG. 10, showing the tape container according to a further embodiment of the present invention.
Figure 14:
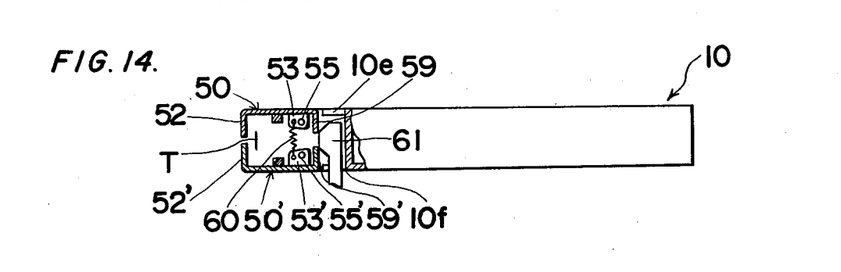
FIG. 14 is a partially sectional side view of the tape container of FIG. 13, with the protective covering in the closed position.
Figure 15:
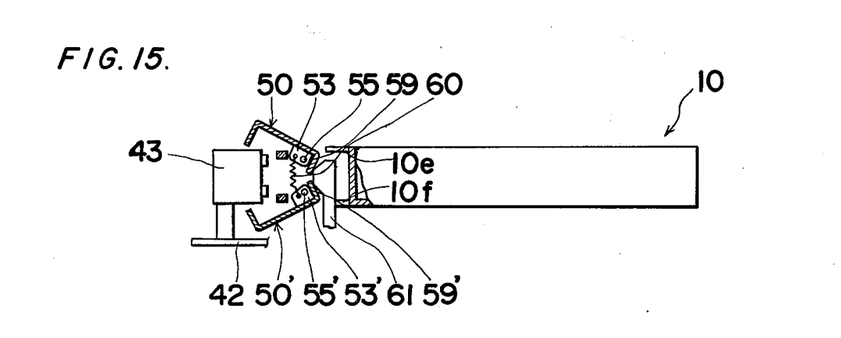
FIG. 15 is a view similar to FIG. 14, showing the protective covering in the opened position.
Figure 16:
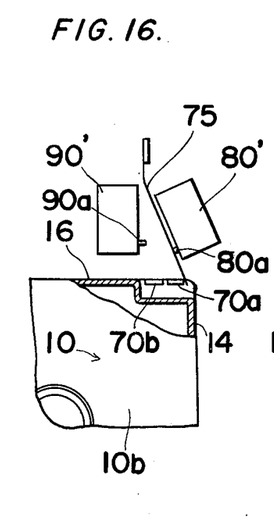
FIGS. 16 to 18 illustrate a portion of the tape container through which switches are actuated in different manners upon insertion of the tape container into a tape container receiving chamber of the magnetic tape player, which switches are provided in an equalizer circuit of the magnetic tape plcyer to select one of predetermined levels of output from the equalizer circuit.
Figure 17:
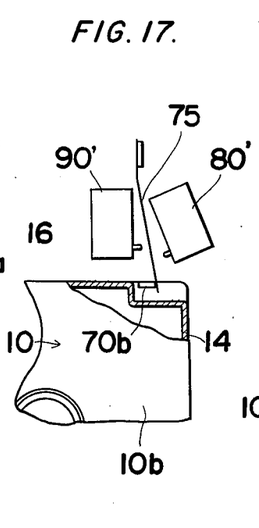
Figure 18:
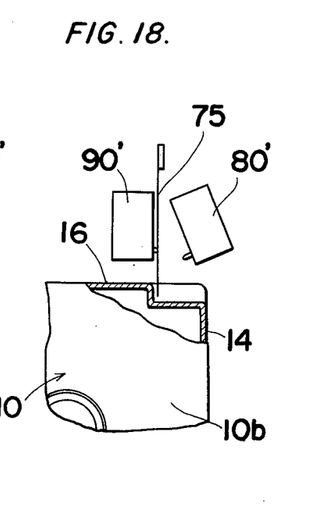

In the embodiment shown in FIGS. 13 to 15, a method of opening the protective covering in this embodiment is quite different from that employed in the foregoing embodiment of FIGS. 8 to 12. In other words, the protective covering in the embodiment of FIGS. 13 to 15 can be opened only by manipulating an operating mechanism (not shown) disposed on the control panel of the magnetic tape player.

For this purpose, without employing the leaf springs 56 and 56' such as employed in the embodiment of FIGS. 8 to 12, the lips 52 and 52' are closed by a tension spring 60 suspended between each of the lugs 53 in the first lid 50 and the associated one of the lugs 53' in the second lid 50. In addition, respective side portions of the first and second plate members 51 and 51' remote from the lips 52 and 52' are bent to provide individual flaps 59 and 59' which face each other. By the action of the tension springs 60, the lips 52 and 52' are closed toward each other as shown in FIG. 14.

Extending into the interior of the cassette 10 through one of substantially rectangular openings 10e and 10f respectively formed in the plate members 10a and 10b, is an operating rod 61. This operating rod 61 has one end operatively coupled to the operating mechanism (not shown) in the magnetic tape player and the other end situated behind the flaps 59 and 59' and adapted to engage both of the flaps 59 and 59' simultaneously. The operating rod 61 so far illustrated is to be understood as supported in position for movement between engaged and disengaged positions close to and away from the transducer assembly and normally biased to the disengaged position by a biasing spring element (not shown). The operating rod 61 is further to be understood as being moved to the engaged position against the biasing spring element when the operating mechanism is manipulated by an operator of the magnetic tape player.

With the above in mind, when the cassette 10 is placed within the cassette receiving chamber of the magnetic tape player, the operating rod 61 in the disengaged position penetrates through the opening 10e or 10f and is held in position behind the flaps 59 and 59', substantially as shown in FIG. 14. If the operating mechanism is subsequently manipulated, the operating rod 61 moves towards the engaged position against the biasing spring element, thereby causing the first and second lids 50 and 50' to pivot simultaneously about the respectively associated connecting elements 55 and 55'. In this way, the lips 52 and 52' are separated, as shown in FIG. 15.

On the other hand, if the operating mechanism is reversely operated, or otherwise released, the operating rod 61 will return to the original, disengaged position.

In order to make it possible that placement of the cassette 10 within the cassette receiving chamber of the magnetic tape player varies the peak value of bias current to be applied from a bias oscillator to the transducer assembly and/or the level of output from an equalizer circuit according to the type of magnetic tape housed in the particular cassette, the tape cassette according to the present invention is provided with a switching device which will now be described with reference to FIGS. 3, 5, 6, 10, 13 and 16 to 18.

The switching device so far illustrated in FIGS. 3, 5, 6, 10, 13 and 16 to 18 comprises a plurality of breakable pieces, only two of which are shown by 70a and 70b. These breakable pieces 70a and 70b are constituted by parts of the rear wall 16 of the tape cassette 10 in a substantially similar fashion to a known breakable switching piece which, when it is not desired to erase from the magnetic tape the information which has previously been recorded thereon, is broken to render the "RECORD" button inoperative.

Specifically, these breakable switching pieces 70a and 70b can be defined by forming a consecutive groove, which extends completely through the thickness of the rear wall 16 and which has such a shape as to allow one of the sides of the shape of each of the breakable switching pieces to remain integral with the rear wall 16. In practice, the cassette with the switching pieces 70a and 70b therein can readily be manufactured by means of plastic molding technique.

In FIGS. 3, 5, 6, 10 and 13, micro-switches 80 and 90 are illustrated in cooperative relation to the breakable switching pieces 70a and 70b, respectively. Moreover, each of the switches 80 and 90 is shown as having a push button 80a or 90a and a pivotable actuating lever 80b or 90b having one end pivotally connected to the casing of the switch 80 or 90 and the other end rigidly provided with a feeler 80c or 90c.

Figure 19:
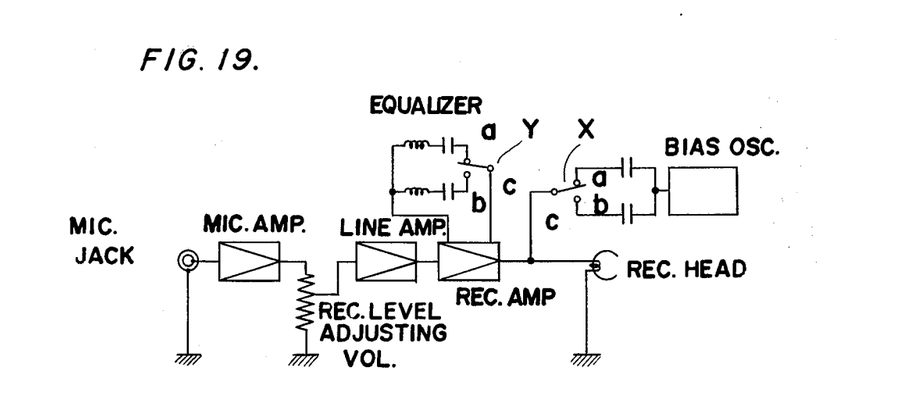
FIGS. 19 to 21 illustrate different electric circuit diagrams including a bias oscillator circuit and the equalizer circuit which may be activated by the features of FIGS. 16-18.

Assuming that the switches 80 and 90 are respectively inserted in the bias oscillator circuit and the equalizer circuit as represented by switches X and Y in the circuit diagram of FIG. 19 and that each of the switches 80 and 90 has a pair of spaced stationary contacts $a$ and $b$ and a movable contact $c$ associated with the push button 80a or 90a and normally biased to the stationary contact $b$, it will readily be seen that, when the cassette 10 without the switching pieces 70a and 70b being broken is inserted into the cassette receiving chamber of the magnetic tape, the switching pieces 70a and 70b push the associated feelers 80c and 90c and, therefore, the push buttons 80a and 90a are both depressed so that the movable contacts $c$ of the respective switches X or 80 and Y or 90 are shifted to engage the other stationary contacts $a$ as shown in the circuit diagram of FIG. 19.

On the other hand, if the cassette 10 is inserted into the cassette receiving chamber of the magnetic tape player with both of the switching pieces 70a and 70b broken away, it is clear that the movable contacts $c$ of the respective switches X and Y are engaged to the stationary contacts $b$.

In this way, so far as the switches 80 and 90 are respectively inserted into the bias oscillator circuit and the equalizer circuit, such as described above, the bias oscilator circuit and equalizer circuit can be switched in two different operating modes and four combinations of operating modes of the bias oscillator and equalizer circuit can be possible.

Figure 20:
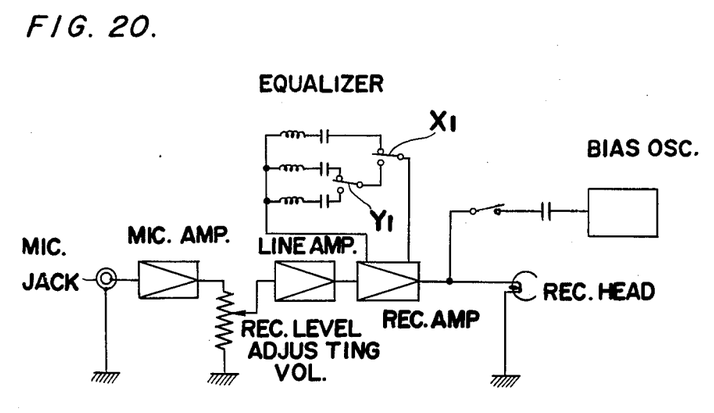
Figure 21:
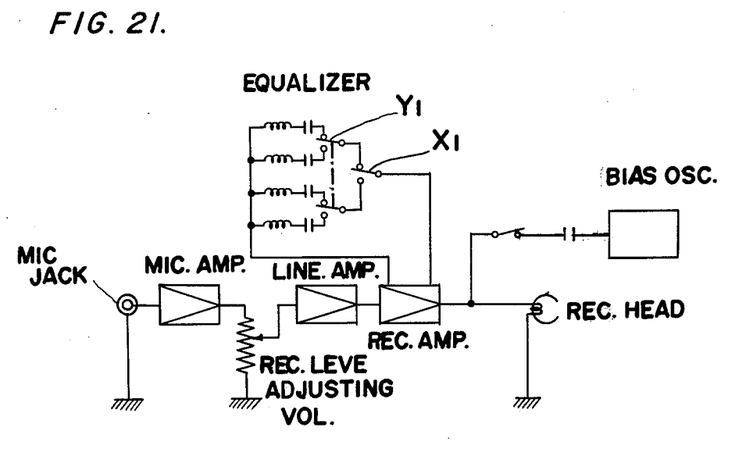

Furthermore, if the bias oscillator circuit employed in the electric circuit of the magnetic tape player is designed such as to generate a bias current of fixed value and the equalizer circuit is desired to be swithed in four different operating modes, these switches 80 and 90 may be arranged such as represented by switches $X_1$ and $Y_1$ in the circuit diagram of FIG. 20.

Where the number of the breakable switching pieces referred to above is three and an additional micro-switch, in addition to the switches 80 and 90, is employed in association with the additional breakable switching piece and so far as the equalizer circuit is concerned, these switches may be arranged such as shown in the circuit diagram of FIG. 21 in which case the equalizer circuit can be switched in eight operating modes.

While the switches 80 and 90 in FIGS. 3, 5, 6, 10 and 13 are arranged such that, when the cassettes 10 is inserted into, or otherwise placed within, the cassette receiving chamber of the magnetic tape player with the rear end thereof first, one or both of the switches 80 and 90 can be operated in response to the presence or absence of one or both of the breakable switching pieces 70a and 70b, the switches 80' and 90' are arranged such as to be operated by a common actuating member 75, for example, in the form of a leaf spring having one end secured to a fixed portion of the magnetic tape player and the other end terminating on the path of travel of the switching pieces 70a and 70b, which actuating member 75 can be deformed in three states depending upon the precence or absence of one or both of the switching pieces 70a and 70b as the cassette 10 is inserted into the cassette receiving chamber of the magnetic tape player with one of the opposite sides adjacent the pieces 70a and 70b first.

Therefore, it is clear that the employment of one or more breakable switching pieces in the cassette is advantageous in that one or more electrical circuits in the magnetic tape player can automatically be switched in different operating modes in response to placement or insertion of the tape cassette into the cassette receiving chamber of the magnetic tape player. It is to be noted that the number of the breakable switching pieces 70a and 70b need not be limited to two, but may be one or more than two.

Although the present invention has been fully described in conjunction with the preferred embodiments thereof, it is to be noted that various changes and modifications are apparent to those skilled in the art. Such changes and modifications are accordingly to be understood as included within the true scope of the present invention unless they depart therefrom.

What is claimed is:

1. A tape container for accommodating therein a magnetic tape designed for use in a magnetic recording and/or reproducing apparatus of the type having a container receiving chamber, at least one recording and/or reproducing transducer supported in position for movement between engaged and disengaged positions, and at least one capstan and an idler wheel cooperative with said capstan for driving the magnetic tape, said tape container comprising:

a housing of generally rectangular configuration including first and second generally rectangular spaced plate members and a peripheral wall extending between said first and second plate members along three of the sides thereof;

a first access opening means, defined in said housing along the fourth side thereof, for allowing access to a portion of the magnetic tape and for receiving the transducer when moved to the engaged position thereof so that the transducer may engage said portion of the magnetic tape;

first and second reels to which respective ends of the magnetic tape are secured, said first and second reels being rotatably supported within said housing in spaced relation to each other, each of said first and second reels having at least one radially outwardly extending flange;

second and third access opening means defined in said housing along said fourth side thereof and at opposite sides of the first access opening for selectively alternately receiving therethrough, when the tape container is placed within the container receiving chamber, the capstan in readiness for driving the magnetic tape from either of one of the said first and second reels towards the other of said first and second reels in cooperation with the idler wheel;

protective covering means, supported by said housing, for movement between a closed position covering said first access opening means and an open position permitting the transducer to extend into said first access opening means and to contact said portion of the magnetic tape, said protective covering means comprising first and second lids pivotally supported by said housing, and means for biasing said first and second lids toward each other to said closed position; and means, formed in one of said three sides of said housing, for operating a switching element forming a part of an electric circuit of the apparatus when said container is placed in the container receiving chamber of the apparatus.

2. A tape container as claimed in claim 1, wherein said first and second lids are pivoted in a direction away from each other against said biasing means in response to placement of said container within the container receiving chamber of the apparatus.

3. A tape container as claimed in claim 2, further comprising braking means supported within said housing for movement between first and second positions, and means for biasing said braking means to said first position, said braking means when held in said first position applying a braking force to both of said reels to halt idle rotation of said reels within said housing, said braking means being movable to said second position against said biasing means when the tape container is placed within the container chamber of the apparatus.

4. A tape container as claimed in claim 1, wherein said first and second lids are pivoted in a direction away from each other against said biasing means after the tape container is placed within the container receiving chamber of the apparatus and when an external manipulating mechanism operatively coupled thereto is operated.

5. A tape container as claimed in claim 4, further comprising braking means supported within said housing for movement between first and second positions, and means for biasing said braking means to said position, said braking means when held in said first position applying a braking force to both of said reels to halt idle rotation of said reels within said housing, said braking means being movable to said second position against said biasing means when the tape container is placed within the container receiving chamber of the apparatus.

6. A tape container as claimed in claim 1, further comprising braking means supported within said housing for movement between first and second positions, and means for biasing said braking means to said first position, said braking means when held in said first position applying a braking force to both of said reels to halt idle rotation of said reels within said housing, said braking means being movable to said second position against said biasing means when the tape container is placed within the container receiving chamber of the apparatus.

7. A tape container as claimed in claim 1, wherein said switching element operating means comprises at least two breakable switching pieces adapted to switch an equalizer circuit and a bias oscillating circuit, respectively, in different operating modes depending upon the presence or absence of one or both of said breakable switching pieces.

8. A tape container as claimed in claim 1, wherein said switching element operating means comprises a plurality of breakable switching pieces formed in a row in said one housing side, said breakable switching pieces when said container is inserted into the container receiving chamber of the apparatus in a direction transverse to the direction of movement of the transducer assembly, operating at least one switching element in different operating modes depending upon the presence or absence of one or more of said breakable switching pieces.

* * * * *